W. & C. Sellers.
Shaft Couplings.
N°. 17,236.
Patented May 5, 1857.
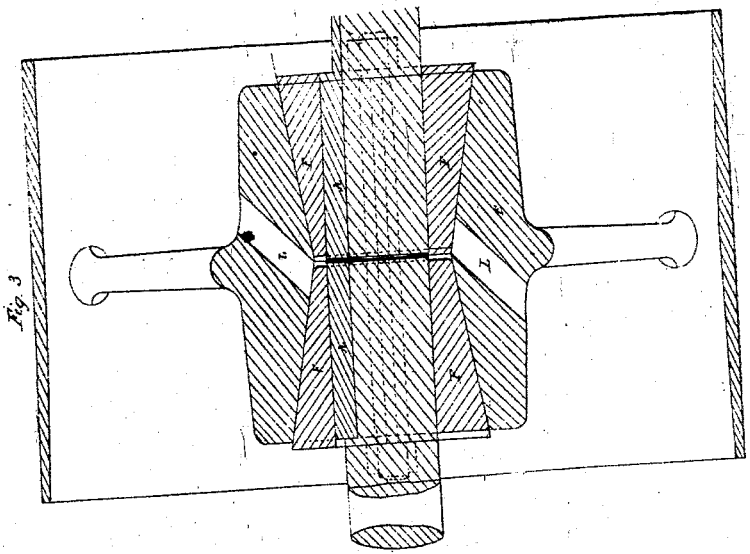
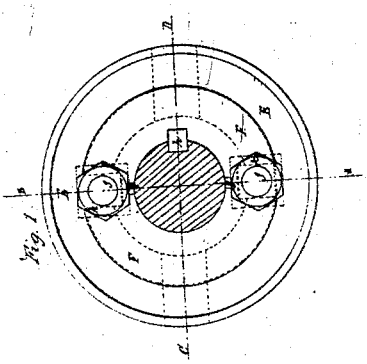
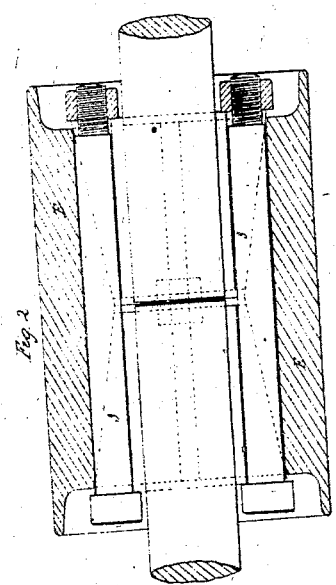
Witnesses:
Inventors
William Sellers
Coleman Sellers

UNITED STATES PATENT OFFICE.

WILLIAM SELLERS AND COLEMAN SELLERS, OF PHILADELPHIA, PA.

IMPROVEMENT IN COUPLINGS FOR SHAFTING.

Specification forming part of Letters Patent No. 17,236, dated May 5, 1857.

*To all whom it may concern:*

Be it known that we, WILLIAM SELLERS and COLEMAN SELLERS, of Philadelphia, in the county of Philadelphia, in the State of Pennsylvania, have invented a new and useful Improvement in Couplings for Shafting; and we do hereby declare the following is a full, clear, and exact description thereof, reference being had to the annexed drawings, making part of this specification, in which—

Figure 1 is an end view. Fig. 2 is a longitudinal section through A B, and Fig. 3 is a longitudinal section through C D.

On these several figures similar letters refer to similar parts.

Our coupling is composed of an external sleeve, E, into opposite ends of which are fitted two sleeves, F F, in the form of frustums of cones, the apexes of the cones being toward each other. These conical sleeves are bored to fit the shafts intended to be coupled, and are divided by one or more longitudinal cuts, *g g*, to enable them to be closed on the shafts. They are prevented from turning on the shafts by the keys *h h*, and are drawn together by the square bolts I I, which pass through part of the external sleeve, E, and thus serve the purpose of keys to prevent the two internal conical sleeves from turning in the external sleeve, E.

To apply the coupling to the purpose intended the various parts are brought together, as in the drawing, and placed upon the shafts to be coupled. The nuts *k k* upon the bolts I I are then turned so as to draw the internal conical sleeves, F F, together and into the external sleeve, E, thus compressing them upon the shafts and holding them firmly in their place.

The advantage to be derived from this arrangement is in having a separate internal conical sleeve for each shaft, thus insuring a pressure upon both shafts, a slight difference in the size of the shafts not affecting the operation of the coupling, and the peculiar manner of putting in the bolts, making them serve as keys to connect the different parts of the coupling, gives great solidity and strength to the whole when drawn together.

To loosen the coupling the nuts *k k* have to be slacked, and a key or wedge driven through the hole L, between the internal sleeves, F F, thereby forcing them apart and relaxing them from the shafts. The whole coupling may then be slipped onto one or the other shaft, as most convenient, and then taken down. This coupling may be used as a pulley, as shown in Fig. 3.

We do not claim the use of a conical sleeve within an external sleeve to hold to a shaft; but What we do claim as new, and desire to secure by Letters Patent, is—

1. The use of two conical sleeves within one external sleeve, when they are so arranged as to compress the ends of the coupled shafts separately, whether the shafts be of the same or different diameters, substantially as described.

2. Bolting said conical sleeves together as described, or in any other mode substantially the same, whereby the bolts may serve as keys to prevent the internal cones from turning in the external sleeve.

WILLIAM SELLERS.
COLEMAN SELLERS.

Witnesses:
WM. BANCROFT,
WM. S. LEVERING.